United States Patent
Feinstein et al.

(10) Patent No.: US 7,810,355 B2
(45) Date of Patent: Oct. 12, 2010

(54) FULL PERIMETER CHEMICAL STRENGTHENING OF SUBSTRATES

(75) Inventors: Casey J. Feinstein, San Jose, CA (US); John Z. Zhong, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 12/165,336

(22) Filed: Jun. 30, 2008

(65) Prior Publication Data
US 2009/0324899 A1    Dec. 31, 2009

(51) Int. Cl.
C03C 25/00   (2006.01)
C03C 21/00   (2006.01)

(52) U.S. Cl. .................... 65/30.1; 65/30.14; 65/31; 65/105; 216/20; 216/83; 216/97

(58) Field of Classification Search ........... 65/30.14, 65/30.1, 31, 105; 216/20, 83, 97
See application file for complete search history.

(56) References Cited

U.S. PATENT DOCUMENTS

| | | | |
|---|---|---|---|
| 3,843,472 A * | 10/1974 | Toussaint et al. | 428/192 |
| 5,411,563 A | 5/1995 | Yeh | |
| 5,483,261 A | 1/1996 | Yasutake | |
| 5,488,204 A | 1/1996 | Mead et al. | |
| 5,654,057 A | 8/1997 | Kitayama | |
| 5,733,622 A | 3/1998 | Starcke | |
| 5,825,352 A | 10/1998 | Bisset et al. | |
| 5,835,079 A | 11/1998 | Shieh | |
| 5,880,411 A | 3/1999 | Gillespie et al. | |
| 6,050,870 A * | 4/2000 | Suginoya et al. | 445/24 |
| 6,120,908 A | 9/2000 | Papanu et al. | |
| 6,188,391 B1 | 2/2001 | Seely et al. | |
| 6,310,610 B1 | 10/2001 | Beaton et al. | |
| 6,323,846 B1 | 11/2001 | Westerman et al. | |
| 6,690,387 B2 | 2/2004 | Zimmerman et al. | |
| 6,718,612 B2 * | 4/2004 | Bajorek | 29/424 |
| 7,015,894 B2 | 3/2006 | Morohoshi | |
| 7,184,064 B2 | 2/2007 | Zimmerman et al. | |

(Continued)

FOREIGN PATENT DOCUMENTS

JP   2000-163031 A   6/2000

(Continued)

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

(Continued)

*Primary Examiner*—Jason L Lazorcik
*Assistant Examiner*—Erin Snelting
(74) *Attorney, Agent, or Firm*—Morrison & Foerster LLP (57) ABSTRACT

Methods and apparatus for protecting the thin films during chemical and/or thermal edge strengthening treatment. In one embodiment, a portion of each individual sheet is laminated. Pairs of sheets are then sealed together such that the thin film sides face inward to form a thin film sandwich. In some embodiments, the sandwich in then immersed in a chemical strengthener. In other embodiments, a localized treatment is applied to the unstrengthened edges.

15 Claims, 7 Drawing Sheets

U.S. PATENT DOCUMENTS

| | | |
|---|---|---|
| 2006/0026521 A1 | 2/2006 | Hotelling et al. |
| 2006/0097991 A1 | 5/2006 | Hotelling et al. |
| 2006/0197753 A1 | 9/2006 | Hotelling |
| 2007/0063876 A1* | 3/2007 | Wong .......................... 341/34 |
| 2007/0122542 A1* | 5/2007 | Halsey et al. ................. 427/58 |
| 2009/0162703 A1* | 6/2009 | Kawai ........................ 428/832 |
| 2009/0324939 A1* | 12/2009 | Feinstein et al. ............ 428/337 |

FOREIGN PATENT DOCUMENTS

| | | |
|---|---|---|
| JP | 2002-342033 A | 11/2002 |

OTHER PUBLICATIONS

Rubine, D.H. (Dec. 1991). "The Automatic Recognition of Gestures," CMU-CS-91-202, Submitted in Partial Fulfillment of the Requirements of the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

* cited by examiner

FULL PERIMETER CHEMICAL STRENGTHENING OF SUBSTRATES

FIELD OF THE INVENTION

The present invention relates generally to substrate strengthening. More particularly, the present invention is directed in one exemplary aspect to chemically strengthening the edges of substrates comprising thin film deposits.

BACKGROUND OF THE INVENTION

Touch sensor panels are typically fabricated as one or more thin films deposited and patterned into conductive traces upon one or both sides of a chemically strengthened sheet of glass. However, standard thin film equipment does not allow for thin film deposition on custom-sized or shaped sheets of glass. Instead, thin film deposition occurs on large, rectangular sheets of glass (called mother sheets) which are subsequently separated and shaped into a plurality of individual glass sheets. The individual sheets are typically used in separate electronic devices.

When the mother sheet is separated into individual sheets, however, a new set of edges is formed along each path of separation. Since the new set of edges has not been chemically treated, the individual sheets are susceptible to cracking.

Conventional techniques for chemically strengthening glass require immersion of the sheet into a chemical treatment for a certain period of time and at a certain temperature. In many cases, chemically strengthening the edges is infeasible since the exposed film would be damaged by the chemicals and/or the temperature required for the treatment.

SUMMARY OF THE INVENTION

Various embodiments of the present invention relate to chemically strengthening the edges of glass sheets having thin films deposited on at least one surface. Thin films are typically deposited and patterned upon discrete regions of a chemically strengthened sheet of glass. This sheet of glass is called a mother sheet. The mother sheet is typically cut into separate sheets, where each sheet is adapted to service a separate electronic component or device.

When the mother sheet is separated, a new set of edges are formed at the path of separation. These edges have not been chemically strengthened and are therefore sensitive to forces exerted upon them. While applying a chemical strengthener to the edges of the sheets would protect the sheets from cracking, this tends to damage exposed regions of the thin film. Moreover, since standard thin film equipment lacks the capability to apply thin film processes to glass in different and/or smaller sizes than a mother sheet, in many cases, the thin film deposition process must precede the separation process.

Various embodiments of the present invention address these concerns by protecting the thin films during the chemical and/or thermal edge strengthening treatment. In one embodiment, a portion of each individual sheet is laminated. Pairs of sheets are then sealed together such that the thin film sides face inward to form a thin film sandwich. In some embodiments, the sandwich in then immersed in a chemical strengthener. In other embodiments, a localized treatment is applied to the unstrengthened edges.

DETAILED DESCRIPTION OF THE PREFERRED EMBODIMENTS

In the following description of preferred embodiments, reference is made to the accompanying drawings in which it is shown by way of illustration specific embodiments in which the invention can be practiced. It is to be understood that other embodiments can be used and structural changes can be made without departing from the scope of the embodiments of this invention.

Various embodiments of the present invention relate to chemically strengthening the edges of glass sheets having thin films deposited on at least one surface. Thin films are typically deposited and patterned upon discrete regions of a chemically strengthened sheet of glass. This sheet of glass is called a mother sheet. The mother sheet is typically cut into separate sheets, where each sheet is adapted to service a separate electronic component or device.

When the mother sheet is separated, a new set of edges are formed at the path of separation. These edges have not been chemically strengthened and are therefore sensitive to forces exerted upon them. While applying a chemical strengthener to the edges of the sheets would protect the sheets from cracking, this tends to damage exposed regions of the thin film. Moreover, since standard thin film equipment lacks the capability to apply thin film processes to glass in different and/or smaller sizes than a mother sheet, in many cases, the thin film deposition process must precede the separation process.

Various embodiments of the present invention address these concerns by protecting the thin films during the chemical and/or thermal edge strengthening treatment. In one embodiment, a portion of each individual sheet is laminated. Pairs of sheets are then sealed together such that the thin film sides face inward to form a thin film sandwich. In some embodiments, the sandwich in then immersed in a chemical strengthener. In other embodiments, a localized treatment is applied to the unstrengthened edges.

Although embodiments of the invention may be described and illustrated herein in terms of touch sensor panels, it should be understood that embodiments of this invention are not so limited, but are additionally applicable to any circuit or communication path formed on a glass substrate or other substrate prone to weakness at an unstrengthened edge.

FIGS. 1A-1E are block diagrams illustrating an exemplary method of strengthening glass according to embodiments of the present invention. Each figure in the sequence depicts a step in the described method.

Figure 1A:
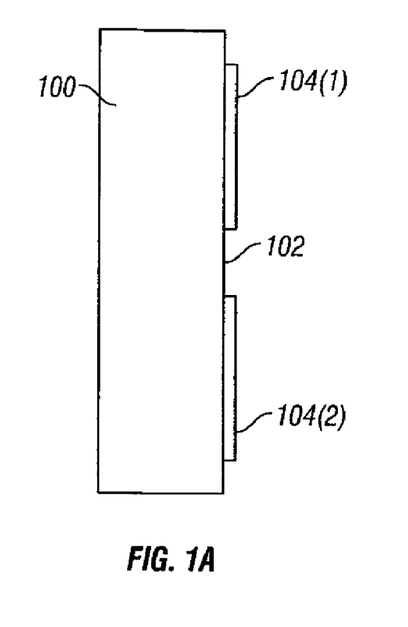
FIG. 1A is a block diagram of an exemplary thin-film deposition process according to embodiments of the present invention.

FIG. 1A is a block diagram of an exemplary thin-film deposition process according to embodiments of the present invention. Initially, a mother sheet 100 is adapted to receive at least one thin film deposit upon at least one target surface 102. The mother sheet is often a large, rectangular sheet of glass, but may be any size or shape according to embodiments of the present invention. In some embodiments (such as the one depicted in FIG. 1A) the surfaces of the mother sheet 100 have already been chemically strengthened (for example, by immersion into a chemical substance for a certain period and at a certain temperature). In other embodiments, the mother sheet has not been chemically treated or strengthened.

One or more thin films 104(1) and 104(2) are then deposited upon discrete regions of the target surface 102 and patterned. Note that even though FIG. 1A depicts two thin films 104(1) and 104(2) deposited upon the target surface 102, the target surface 102 can comprise any number of thin films 104 according to embodiments of the present invention. Additionally, the thin films 104 can be situated in any position along both axes of the surface 102.

In some embodiments, at least one of the thin films 104(1) and 104(2) is indium tin oxide (ITO). In some embodiments, other materials are utilized in addition to, or instead of, ITO. These materials include, without limitation, amorphous silicon, copper indium diselenide, cadmium telluride and film crystalline silicon. Optionally, the thin films 104(1) and 104(2) can be protected by one or more passivation layers (organic and/or inorganic). Passivation layers are compositions formed over conductive material and other layers which protect those materials from corrosion and other environmental effects. Various types of passivation can be employed according to embodiments of the present invention. These include, without limitation, passivation layers comprising silicon dioxide ($SiO_2$) and/or silicon nitride (SiNx).

Figure 1B:
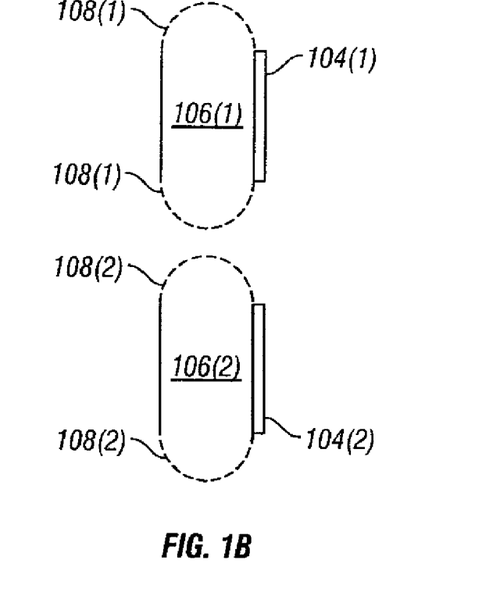
FIG. 1B is a block diagram of an exemplary separation process according to embodiments of the present invention.

FIG. 1B is a block diagram of a separation process according to embodiments of the present invention. As shown in the figure, the mother sheet 100 has been separated into a plurality of individual sheets 106(1) and 106(2). Note that even though FIG. 1B depicts two sheets 106(1) and 106(2) being formed from the mother sheet 100, any number of individual sheets 106 may be formed from the mother sheet. Also note that in some embodiments, the individual sheets 106 are shaped (e.g., cut into a specific geometry) upon separation from the mother sheet 100. In other embodiments, one or more shaping processes are employed subsequent to separation.

Additionally, any number of means or mechanisms can be used in order to accomplish separation from the mother sheet 100. This includes, without limitation, etching, laser scribing, mechanical scribing, and/or grinding and polishing. In some embodiments, the edges of the separated sheets 106(1) and 106(2) include at least one curved portion (e.g., as depicted by the unstrengthened edges 108(1) and 108(2)). However, the glass sheets may be separated and/or shaped using any pattern or geometry according to embodiments of the present invention. This includes glass shapes having flat edges, cylindrical edges, uneven edges, and edges including extended regions.

Once the individual sheets have been separated, one or more unstrengthened edges 108(1) and 108(2) are formed along the paths of separation (or alternatively, upon the specific surfaces that have been shaped). In several embodiments, such as the one illustrated in FIG. 1B, the unstrengthened edges 108 adjoin one or more surfaces that have already been chemically strengthened (for example, by a strengthening process applied to the mother sheet 100). In some embodiments, the unstrengthened edges 108 are part of a larger set of unstrengthened regions.

Figure 2A:
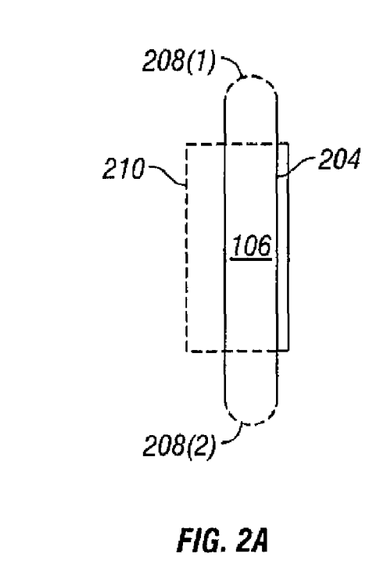
FIG. 2A is a block diagram illustrating an exemplary glass shape comprising unstrengthened edges which do not extend to the region situated directly behind the thin film according to embodiments of the present invention.
Figure 2B:
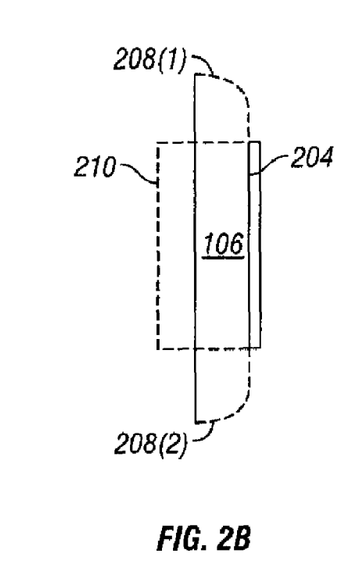
FIG. 2B is a block diagram illustrating an exemplary glass shape comprising unstrengthened edges which extend to the region situated directly behind the thin film on one side according to embodiments of the present invention.
Figure 2C:
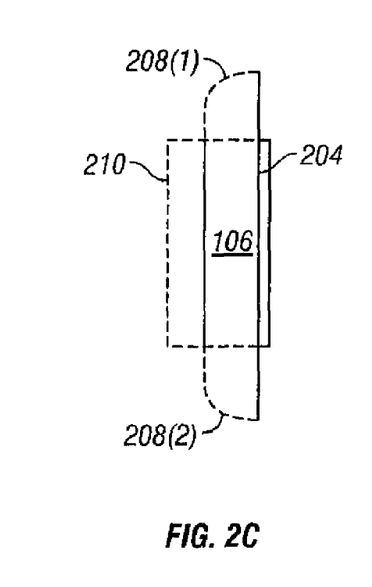
FIG. 2C is a block diagram illustrating an exemplary glass shape comprising unstrengthened edges which extend to the region situated directly behind the thin film on one side according to embodiments of the present invention.
Figure 2D:
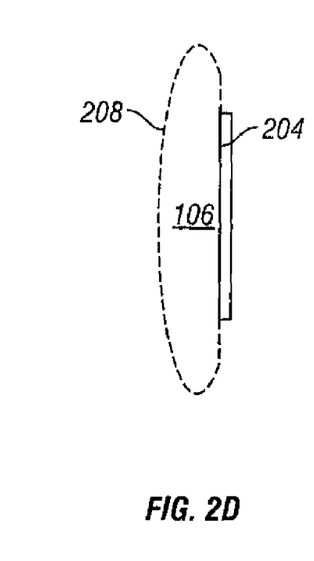
FIG. 2D is a block diagram illustrating an exemplary glass shape comprising a single contiguous unstrengthened surface according to embodiments of the present invention.

Even though FIG. 1B depicts the unstrengthened edges 108(1) and 108(2) as each adjoining a strengthened region situated directly behind the thin films 104(1) and 104(2), respectively, this is not necessary according to some embodiments of the present invention. For example, FIG. 2A is a block diagram illustrating an exemplary glass shape including unstrengthened edges 208(1) and 208(2) which do not extend to the region 210 situated directly behind the thin film 204 according to embodiments of the present invention. FIG. 2B and FIG. 2C are block diagrams illustrating exemplary glass shapes including unstrengthened edges 208(1) and 208(2) which extend to the region 210 situated directly behind the thin film 204 on one side of the individual sheet 206 according to other embodiments of the present invention. FIG. 2D is a block diagram illustrating an exemplary glass shape including a single contiguous unstrengthened surface 208 according to still other embodiments of the present invention. Other combinations of strengthened and/or unstrengthened edges are also possible according to embodiments of the present invention.

Figure 1C:
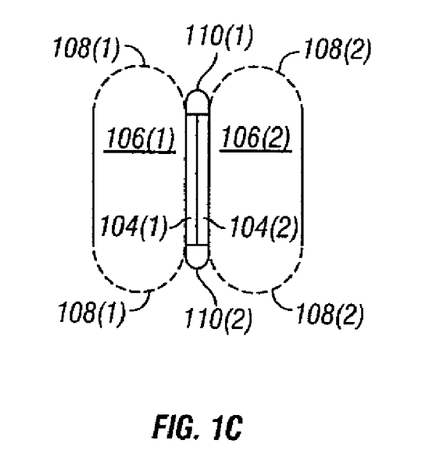
FIG. 1C is a block diagram of an exemplary sealing process according to embodiments of the present invention.

FIG. 1C is a block diagram of an exemplary sealing process according to embodiments of the present invention. As shown by the figure, the individual sheets 106(1) and 106(2) are positioned such that the thin films 104(1) and 104(2) face inward. In some embodiments, an initial laminate, coating, or other protective sheet is applied to at least the regions including the thin films 104(1) and 104(2) before the sealing process commences.

Figure 3A:
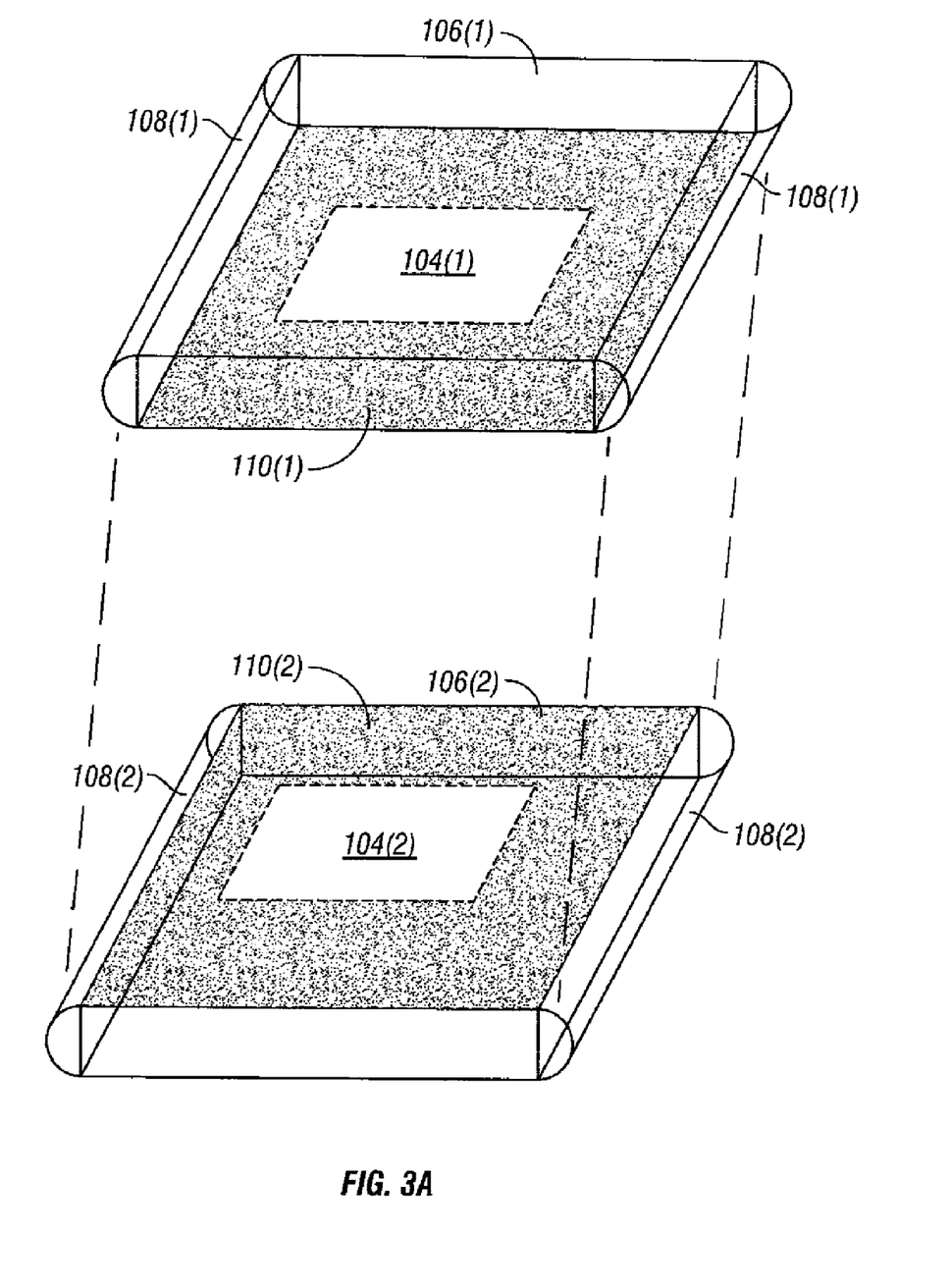
FIG. 3A is a block diagram illustrating an exemplary sealing process according to embodiments of the present invention.

FIG. 3A is a block diagram illustrating a sealing process according to one embodiment of the present invention. Sealants or adhesives are applied to one or more regions of the individual sheets 106(1) and 106(2). For example, the sealants 110(1) and 110(2) may be applied to regions separating the unstrengthened edges 108(1) and 108(2) from the thin films 104(1) and 104(2) (as shown in FIG. 1C). Alternatively, the sealants 110(1) and 110(2) may be applied to the entire perimeter of the thin films 104(1) and 104(2) (as shown in FIG. 3A). A variety of materials may be used for this purpose, including, for example, polymer film, polyimide, SU-8 photoresist, reworkable pressure sensitive adhesives (such as those produced by 3M®), and/or silicone based adhesives. In many embodiments, the thermal and chemical resistances of the sealant are selected so as to withstand the thermal and chemical environment of the strengthening process.

Figure 3B:
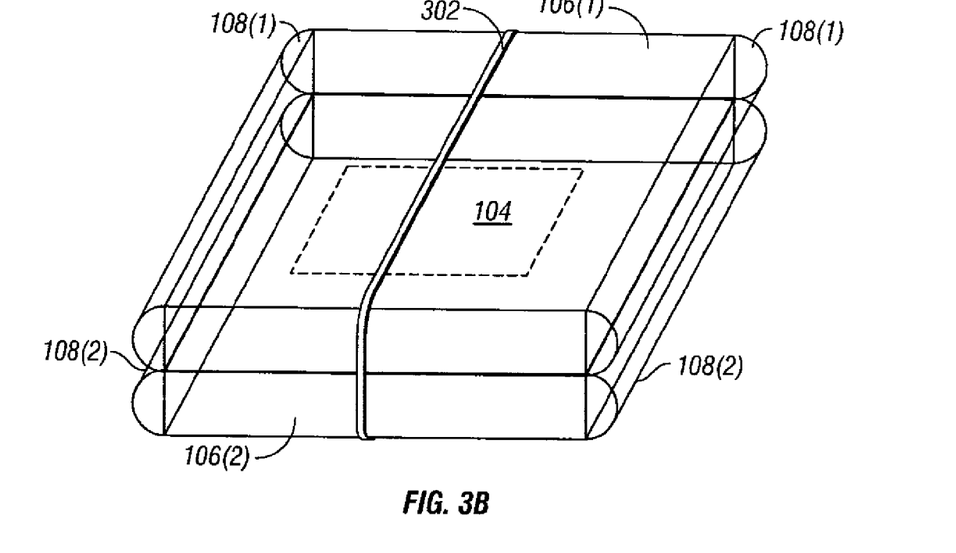
FIG. 3B is a block diagram illustrating an exemplary sealing process according to embodiments of the present invention.

In other embodiments, the sealing process includes sealing the individual sheets 106(1) and 106(2) with an O-ring or other looped elastomer. This includes, without limitation, clamping two individual sheets 106(1) and 106(2) together with a Viton® or Kalrez® O-ring. FIG. 3B is a block diagram illustrating two individual sheets 106(1) and 106(2) fastened by an O-ring 302.

Other forms of sealing are also possible according to embodiments of the present invention. This includes, for example, ties, fasteners, and mechanical clamping devices. Note also that combinations of sealing techniques may also be employed in accordance with embodiments of the present invention (e.g., utilizing an O-ring in addition to a full-face adhesive covering).

Figure 1D:
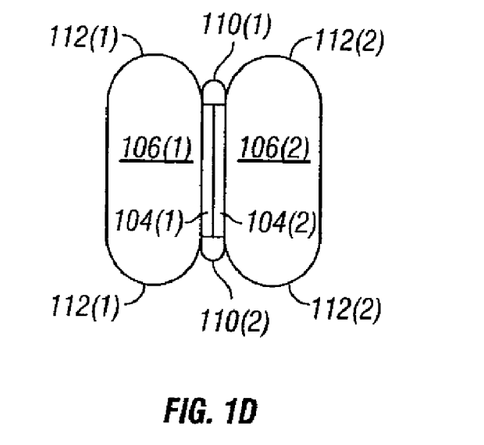
FIG. 1D is a block diagram of an exemplary pair of sealed sheets after a strengthening process has commenced according to embodiments of the present invention.

FIG. 1D is a block diagram of an exemplary pair of sealed sheets 106(1) and 106(2) after a strengthening process has occurred according to embodiments of the present invention. In several embodiments, the strengthening process includes applying a localized treatment to unstrengthened regions of the glass sheets 106. This may be accomplished, for example, by treating only the unstrengthened edges 108(1) and 108(2) of the individual sheets 106(1) and 106(2). In certain embodiments where the mother glass 100 has already been chemically strengthened (for example, by prior immersion in chemical strengthener), application of the localized treatment to the unstrengthened regions results in glass sheets 106 with strengthened surfaces at all sides. In this manner, full perimeter glass strengthening may be accomplished. The substances used to strengthen the unstrengthened regions of the glass sheets 106 may be the same or may be different than the substances used to strengthen the mother sheet 100 according to some embodiments of the present invention.

Additionally, the localized treatment may include, without limitation, one or more of the following: edge polishes (e.g., as via cerium oxide or other similar compounds), acid polishes, chemical etches (e.g., as via hydrogen fluoride or hydrogen chloride), localized heat treatment (e.g., bringing the glass to its glass transition temperature in the range of 500° C.-620° C.) and/or chemical treatments. In many embodiments, the chemical treatment includes filling flaws in the surface of the glass 106 with an adhesive or other similar substance. In one embodiment, for example, potassium nitrate ($KNO_3$) is applied to the unstrengthened regions at 350° C. The selection of chemical substances and thermal settings depends in part upon the type of thin films and/or conductive materials used.

In other embodiments, a non-localized treatment is used for strengthening. In a non-localized treatment, at least a portion of the sealed sheets 106(1) and 106(2) are immersed in one or more chemical substances and treated at a certain temperature. For example, in one embodiment, the chemical substance comprises potassium nitrate ($KNO_3$) applied to the sheets at approximately 350° C. Note that in the above embodiment, the thin film 104 may comprise any combination of indium tin oxide, metal and/or silicon oxide ($SiO_2$), but without organic passivation layers, which react adversely to the high temperature. In certain embodiments where organic passivation layers are utilized, the temperature settings are adjusted accordingly (for example, in one embodiment, the applied temperature is regulated such that it does not exceed 300° C.).

Figure 1E:
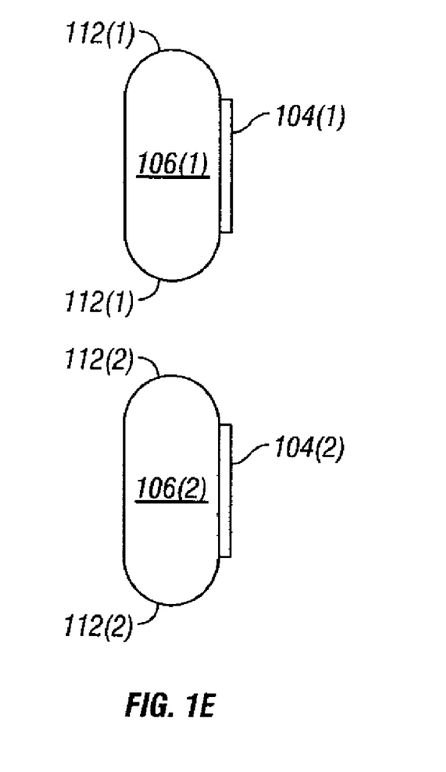
FIG. 1E is a block diagram of exemplary sheets after separation from the seal according to embodiments of the present invention.

Once the treatment process has completed, the edges 112(1) and 112(2) of glass sheets 106(1) and 106(2) have been strengthened. In many embodiments, the sealant, adhesive, or other binding mechanism used in the sealing process is then removed and the sealed sheets 106(1) and 106(2) are separated. In some embodiments, for example, the adhesive used to seal the glass sheets 106(1) and 106(2) is chemically resistive to the strengthening agents but mechanically soft (e.g., 3M® reworkable pressure sensitive adhesives). This property enables the adhesive to be pulled out. The result of the strengthening process is shown in FIG. 1E, which depicts strengthened surfaces of the individual sheets 106(1) and 106(2) at all sides.

Figure 4:
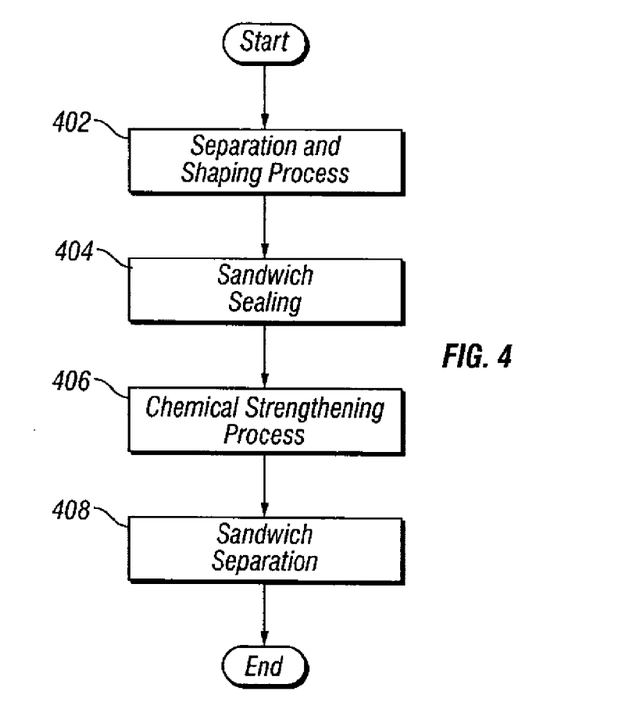
FIG. 4 is a high-level flow diagram illustrating an exemplary method of strengthening a substrate according to embodiments of the present invention.

FIG. 4 is a high-level flow diagram illustrating an exemplary method of strengthening a substrate according to embodiments of the present invention. At block 402, a mother sheet is separated and/or shaped into multiple smaller sheets. Many methods may be used to accomplish separation and shaping according to embodiments of the present invention. This includes, without limitation, etching, laser scribing, mechanical scribing, and/or grinding and polishing.

At block 404, the individual sheets in each pair are positioned such that the surface of each sheet including a sensitive region faces each other, and the sandwich is then sealed. A sensitive region includes materials or components which could be damaged or otherwise adversely affected during chemical and/or thermal treatment (e.g., thin film).

In some embodiments, this sealing process comprises applying a sealant or adhesive around the perimeter of the sensitive regions. In other embodiments, the sealing process includes applying an adhesive over all portions of the thin film and then sealing the sheets together. In still other embodiments, the sealing process includes sealing the sheets together with an O-ring, elastomer, or other flexible substance protecting the thin film.

At block 406, each pair of sealed sheets is then chemically strengthened. In some embodiments, this chemical strengthening process includes subjecting each sandwich to an edge polishing procedure, a chemical etch or acid polish procedure, or a localized heat or chemical treatment. In other embodiments, the chemical strengthening process includes immersing the sandwich into a chemical substance at specific temperature settings (e.g., potassium nitrate ($KNO_3$) at 350° C.).

At block 408, the sandwich is then separated. In some embodiments, for example, the adhesive used to seal the glass sheets 106(1) and 106(2) is chemically resistive to the strengthening agents but mechanically soft, which enables the adhesive to be pulled out.

Figure 5:
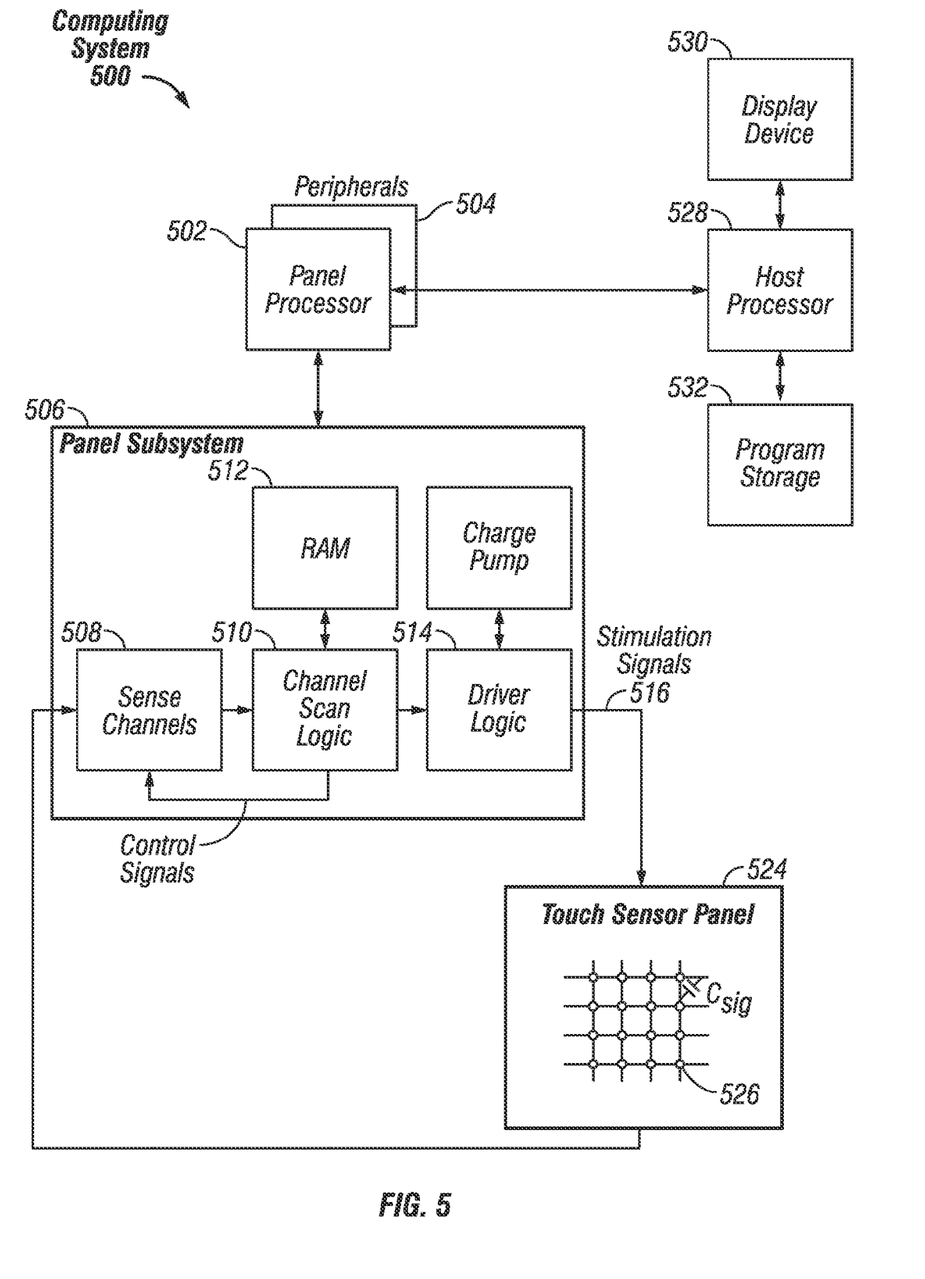
FIG. 5 is a block diagram illustrating an exemplary computing system including a touch sensor panel utilizing a strengthened glass substrate according to embodiments of the invention.

FIG. 5 illustrates exemplary computing system 500 that can include a touch sensor panel 524 situated on a glass substrate that has been strengthened by one or more of the embodiments of the invention described above. Computing system 500 can include one or more panel processors 502 and peripherals 504, and panel subsystem 506. Peripherals 504 can include, but are not limited to, random access memory (RAM) or other types of memory or storage, watchdog timers and the like. Panel subsystem 506 can include, but is not limited to, one or more sense channels 508, channel scan logic 510 and driver logic 514. Channel scan logic 510 can access RAM 512, autonomously read data from the sense channels and provide control for the sense channels. In addition, channel scan logic 510 can control driver logic 514 to generate stimulation signals 516 at various frequencies and phases that can be selectively applied to drive lines of touch sensor panel 524. In some embodiments, panel subsystem 506, panel processor 502 and peripherals 504 can be integrated into a single application specific integrated circuit (ASIC).

Touch sensor panel 524 can include a capacitive sensing medium having a plurality of drive lines and a plurality of sense lines, although other sensing media can also be used. Each intersection of drive and sense lines can represent a capacitive sensing node and can be viewed as picture element (pixel) 526, which can be particularly useful when touch sensor panel 524 is viewed as capturing an "image" of touch. (In other words, after panel subsystem 506 has determined whether a touch event has been detected at each touch sensor in the touch sensor panel, the pattern of touch sensors in the multi-touch panel at which a touch event occurred can be viewed as an "image" of touch (e.g. a pattern of fingers touching the panel).) Each sense line of touch sensor panel 524 can drive sense channel 508 (also referred to herein as an event detection and demodulation circuit) in panel subsystem 506.

Computing system 500 can also include host processor 528 for receiving outputs from panel processor 502 and performing actions based on the outputs that can include, but are not limited to, moving an object such as a cursor or pointer, scrolling or panning, adjusting control settings, opening a file or document, viewing a menu, making a selection, executing instructions, operating a peripheral device coupled to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 528 can also perform additional functions that may not be related to panel processing, and can be coupled to program storage 532 and display device 530 such as an LCD display for providing a UI to a user of the device. Display device 530 together with touch sensor panel 524, when located partially or entirely under the touch sensor panel, can form a touch screen.

Note that one or more of the functions described above can be performed by firmware stored in memory (e.g. one of the peripherals 504 in FIG. 5) and executed by panel processor 502, or stored in program storage 532 and executed by host processor 528. The firmware can also be stored and/or transported within any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any medium that can contain or store the program for use by or in connection with the instruction execution system, apparatus, or device. The computer readable medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

Figure 6A:
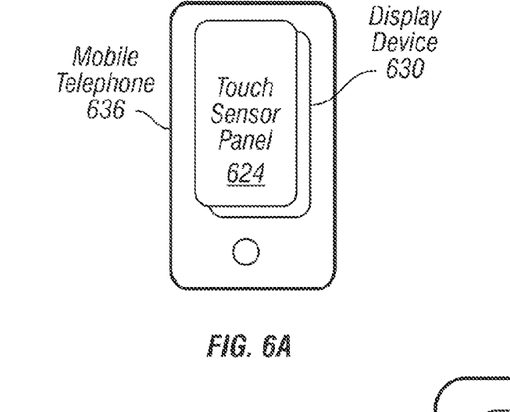
FIG. 6A is a block diagram illustrating an exemplary mobile telephone having a touch sensor panel formed upon a strengthened glass substrate according to embodiments of the invention.

FIG. 6A illustrates exemplary mobile telephone 636 that can include touch sensor panel 624 and display device 630, the touch sensor panel formed upon a glass substrate that has been strengthened according to embodiments of the invention.

Figure 6B:
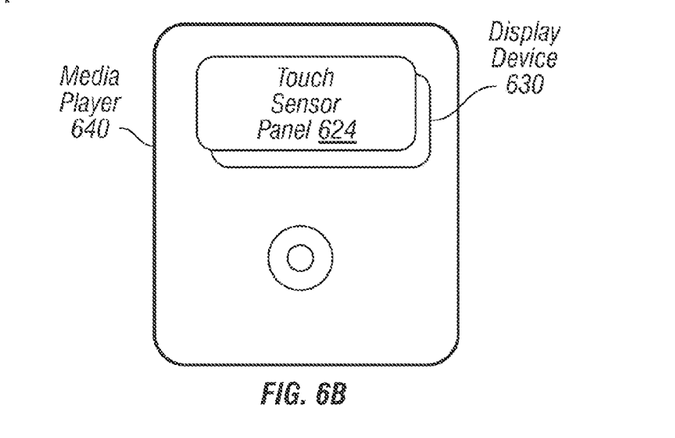
FIG. 6B is a block diagram illustrating an exemplary digital media player having a touch sensor panel formed upon a strengthened glass substrate according to embodiments of the invention.

FIG. 6B illustrates exemplary digital media player 640 that can include touch sensor panel 624 and display device 630, the touch sensor panel formed upon a glass substrate that has been strengthened according to embodiments of the invention.

Figure 6C:
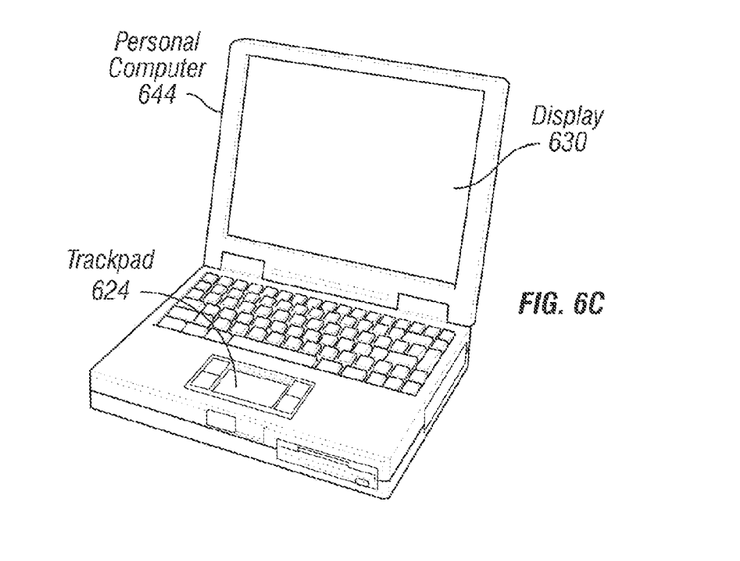
FIG. 6C is a block diagram illustrating an exemplary personal computer having a touch sensor panel (trackpad) and/or display each formed upon a strengthened glass substrate according to embodiments of the invention.

FIG. 6C illustrates exemplary personal computer 644 that can include touch sensor panel (trackpad) 624 and display 630, the touch sensor panel and/or display of the personal computer (in embodiments where the display is part of a touch screen) including a glass substrate that has been strengthened according to embodiments of the invention. The mobile telephone, media player and personal computer of FIGS. 6A, 6B and 6C can achieve improved overall durability by utilizing the strengthened glass substrate according to embodiments of the invention.

Although embodiments of this invention have been fully described with reference to the accompanying drawings, it is to be noted that various changes and modifications will become apparent to those skilled in the art. Such changes and modifications are to be understood as being included within the scope of embodiments of this invention as defined by the appended claims.

What is claimed is:

1. A method for strengthening glass sheets including conductive traces formed thereon, comprising:
    positioning a first glass sheet including a first thin film formed thereon, the first thin film including a first set of conductive traces and having a top surface and a perimeter, and a second glass sheet including a second thin film formed thereon, the second thin film including a second set of conductive traces and having a top surface and a perimeter, such that the top surface of the first thin film faces the top surface of the second thin film;
    sealing the first glass sheet to the second glass sheet with a sealant around the perimeters of the first and second thin films without applying the sealant to the top surfaces;
    applying a strengthening treatment to an untreated region of at least one of the first glass sheet and the second glass sheet; and
    separating the first and second glass sheets after the strengthening treatment has been applied.

2. The method of claim 1, further comprising:
    forming the first and the second set of conductive traces on a mother sheet of glass; and
    separating the mother sheet into at least a first portion and a second portion, the first portion including the first glass sheet and the second portion including the second glass sheet.

3. The method of claim 2, further comprising,
    chemically strengthening the mother sheet prior to forming the first and the second set of conductive traces.

4. The method of claim 2, wherein separating the mother sheet into at least the first portion and the second portion includes scribing the mother sheet with a laser.

5. The method of claim 2, wherein separating the mother sheet into at least the first portion and the second portion includes etching the mother sheet.

6. The method of claim 2, wherein separating the mother sheet into at least the first portion and the second portion includes applying a process of glass machining to the mother sheet.

7. The method of claim 1, wherein at least one of the first and second thin films includes indium tin oxide.

8. The method of claim 1, wherein the first thin film and the second thin film include a protective layer.

9. The method of claim 1, wherein the sealing includes clamping the first glass sheet and the second glass sheet together with a ring.

10. The method of claim 1, wherein the applying of the strengthening treatment to the untreated region of at least one of the first glass sheet and the second glass sheet includes applying an edge polish to the untreated region.

11. The method of claim 1, wherein the applying of the strengthening treatment to the untreated region of at least one of the first glass sheet and the second glass sheet includes applying a chemical etch to the untreated region.

12. The method of claim 1, wherein the applying of the strengthening treatment to the untreated region of at least one of the first glass sheet and the second glass sheet includes applying an acid polish to the untreated region.

13. The method of claim 1, wherein the applying of the strengthening treatment to the untreated region of at least one of the first glass sheet and the second glass sheet includes immersing the first and second glass sheets into a chemical strengthener.

14. The method of claim 1, wherein the applying of the strengthening treatment to the untreated region of at least one of the first glass sheet and the second glass sheet includes applying a localized strengthening treatment to the untreated regions of the first and second glass sheets.

15. The method of claim 1, wherein the sealing includes applying a first sealant around the perimeter of the first thin film and applying a second sealant around the perimeter of the second thin film.

* * * * *

UNITED STATES PATENT AND TRADEMARK OFFICE
CERTIFICATE OF CORRECTION

| | | |
|---|---|---|
| PATENT NO. | : 7,810,355 B2 | Page 1 of 1 |
| APPLICATION NO. | : 12/165336 | |
| DATED | : October 12, 2010 | |
| INVENTOR(S) | : Casey J. Feinstein et al. | |

It is certified that error appears in the above-identified patent and that said Letters Patent is hereby corrected as shown below:

In column 8, line 65, in claim 3, delete "comprising," and insert -- comprising: --, therefor.

Signed and Sealed this
Fifteenth Day of November, 2011

David J. Kappos
*Director of the United States Patent and Trademark Office*